Patented June 26, 1928.

1,675,309

UNITED STATES PATENT OFFICE.

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE.

CONTACT SULPHURIC-ACID PROCESS.

No Drawing. Application filed August 24, 1927. Serial No. 215,263.

This invention relates to the catalytic oxidation of sulphur dioxide to sulphur trioxide, the so-called contact sulphuric acid process.

According to the present invention gaseous mixtures containing sulphur dioxide and oxygen are oxidized catalytically at the usual elevated reaction temperatures in the presence of catalysts which when freshly prepared contain catalytically active zeolites which are the reaction product of more than two classes of components or derivatives of said zeolites and which in the specification and claims will be termed multi-component zeolites. Some of the new catalysts have been described and claimed as products in my copending application Serial No. 142,783, filed October 19, 1926.

Zeolite forming components may be divided into three classes:—silicates with or without partial substitution of other suitable acidic oxides; metallates, such as alkali metal metallates; and salts of metals which form base exchange bodies when caused to react with silicates under conditions suitable for the production of zeolites. The ordinary zeolites of commerce are prepared by the reaction of a soluble silicate, either with alkali metal metallates or with metal salts. The catalysts of the present invention, on the other hand, are reaction products of a silicate with at least one metallate and at least one metal salt. The present invention is directed to processes of oxidizing sulphur dioxide to sulphur trioxide in the presence of such multi-component zeolites and their derivatives, in which at least one catalytically active element or radical is chemically combined with or in the zeolite. Both diluted and undiluted multi-component zeolite catalysts can be used in the present invention, but I prefer in most cases to use diluted multi-component zeolites. In the diluted zeolite contact masses used in the present invention, the catalytic power may reside wholly in the zeolite or in chemical combination therewith or it may reside partly in the zeolite and partly in diluents combined therewith to form mixtures or preferably physically homogeneous structures.

1. I do not here claim processes of oxidizing sulphur dioxide to sulphur trioxide in the presence of catalysts which contain catalytically inactive zeolites associated with catalytically active diluents, these processes forming the subject-matter of my co-pending application Serial No. 174,414, filed March 10, 1927.

2. All of the base exchange bodies used in the present invention, both diluted and undiluted, possess a remarkably porous, honeycomb-like structure, and are in many cases opalescent. When suitable catalytically active components are present, they form catalysts or contact masses of remarkable efficiency, due probably in part at least to the extraordinarily high surface energy of the microscopically porous structures, and probably also to the presence of unsaturated valences in many cases and asymmetry of the molecules. It is of course possible that the catalytic activity of the contact masses used in the present invention is due partly or wholly also to other reasons, and the present invention is therefore not intended in any sense to be limited to any theory of action of the products. The molecular complexes which are present in the products used in the present invention are apparently of great size and complexity, and the exact chemical constitution has not been determined, nor has it been determined definitely whether in all cases single chemical compounds are formed, and it is possible that in some cases at least molecular mixtures or solid solutions may be present. The products used possess a physically microscopical homogeneity, and behave in many ways as if they were single compounds, or in the case of diluted zeolites, the zeolite skeleton behaves as if it were a single compound, and I am of the opinion that probably in many cases at least the zeolites are actually in fact single compounds of high molecular weight.

It should be understood that the products used in the present invention are chemically quite distinct from zeolites formed by the reaction of a silicate with either metallates or with metal salts, the so-called two-component zeolites.

The products used in the present invention fall into three main types, depending on the relative proportions of the three classes of components:—If the silicate and metallate components predominate over the metal salt components the resulting products resemble the alumino-silicate type of zeolites; if the metal salt and silicate components predominate over the metallate components the resulting products have certain resemblances to the aluminum double silicate type of zeolites; where the metallate and metal salt components predominate over the silicate components the products resemble the nonsilicious base exchange bodies described in my co-pending application Serial No. 171,727, filed February 28, 1927. It should be understood of course that there are no sharp lines dividing the different types, and one type shades over into the other, as the relative proportions of the components are varied. I have found that all three types of zeolites when prepared with suitable catalytically active components, and particularly when containing vanadium, form very effective catalysts for the contact sulphuric acid process.

The fact that the zeolites used in the present invention are the reaction products of silicates with both metallates and metal salts makes it readily possible to introduce catalytically active components of the most varying types, and the introduction of catalytically active components of different types is readily facilitated, since some catalytically active elements or some valences of such elements form metal salts but do not form metallates or vice versa. All such catalytically active components can of course be readily introduced into zeolites used in the present invention, and this constitutes an important advantage. Another important advanage of the invention lies in the fact that apparently owing to the great molecular weight of the zeolites used the proportions of the components entering into the zeolite can be varied practically at will, and exact combining proportions of the various elements are not encountered as in the case of simple chemical compounds of relatively lower molecular weight.

The zeolites of the present invention can be prepared under reaction conditions suitable for the formation of base exchange bodies; that is to say, in reaction mixtures which are finally alkaline to litmus. The best base exchanging power is obtained when the products are prepared in solutions which are neutral or preferably alkaline to phenolphthalein, but products of lower base exchanging powers which for the contact sulphuric acid process are frequently of equal efficiency, can be produced under reaction conditions ranging from phenolphthalein red to litmus indicator turning points. It is not possible to determine whether zeolites formed under such conditions are homogeneous chemical compounds; it may be that in such cases a mixture of zeolites and non-base exchanging polysilicates are produced. The physical structure, however, remains similar and for the contact sulphuric acid process the products are equivalent to zeolites produced under conditions which result in greater base exchanging powers. It should be understood, however, that the word zeolite as used in the present application is limited to polysilicates which have at least some base exchanging power when freshly prepared.

Products used in the present invention may be prepared in many ways:—I have found that usually it is desirable to add the metal salts to the metallates and silicates so that at all time the alkali of the latter components is present in excess, and accordingly the reaction automatically remains alkaline at least to litmus. While, however, this preferred method presents numerous advantages in most cases and results in the production of excellent products with a minimum of supervision, other methods of reaction can be used, and are included in the invention.

Certain of the catalysts used in the present invention may be prepared by adding the silicate or metallate components, or both, to the metal salt components, care being taken that after the reaction is completed the reaction mixture is alkaline to litmus, and preferably neutral or alkaline to phenolphthalein. It is probable that during the reaction, at first ordinary silicates are formed, which are later transformed more or less completely into base exchanging bodies. The base exchanging power of such products is lower than that of products which are prepared by adding the metal salt components to the other two components. So that the reaction continuously remains alkaline, but many effective catalysts can be produced by the other method, and are therefore included in the scope of the present invention.

The number of elements which may be included in the products used in the present invention is very large. Thus for example, any of the metal elements which are capable of forming soluble alkali metal metallates may be used, and similarly complex compounds of metals which metals possess a more or less amphoteric property may be used, and for some purposes are of great importance, as they permit the production of soluble metallate components, whereas the simple oxides of the metals may not be suitable, because they do not form soluble alkali metal metallates. A few among the complex ionogens may be mentioned; ammonia, hydrocyanic acid, sulphocyanic acid, oxalic acid, formic acid, tartaric acid, citric acid, glycerine and various types of sugars.

Certain compounds such as for example, vanadates, molybdates, tungstates, tantalates, and uranates, which are not ordinarily considered as metallates, but which are capable of forming base exchange bodies with soluble silicates and metal salts are intended to be included under the term "metallate" as used in the present invention. I therefore include under this term any alkali metal compound of a metal acid which is capable of forming with soluble silicates and metal salts base exchange bodies, or which can be rendered capable of so reacting by a change of valence which can be effected during the reaction. Thus for example, certain alkali permanganates which are incapable of forming base exchange bodies containing heptavalent manganese may be caused to react with soluble silicates and metal salts in the presence of suitable reducing agents which reduce the permanganate to a stage of oxidation in which it is capable of behaving as a metallate. Such compounds are included under the classification of metallates for the purposes of the present invention, and some very valuable products can be produced by the use of this type of compound. An example of an important element which may be so used is tetravalent vanadium.

The present invention may utilize a single metallate component, or a plurality of metallate components in any desired ratio may be used. The following elements are included among those forming metallates which can be used:—aluminum, chromium, zinc, vanadium, beryllium, tin, palladium, platinum, titanium, lead, tungsten, boron, molybdenum, uranium and tantalum, copper, nickel, iron, cobalt, silver, cadmium, manganese, zirconium, thorium, and cerium.

The metal salt components are likewise numerous, and in general, any water-soluble, acid, neutral or basic salts or any mixtures may be used. The following elements are included among those which form suitable salts:—copper, silver, gold, beryllium, zinc, cadmium, aluminum, rare earths, titanium, zirconium, tin, lead, thorium, chromium, uranium, vanadium, manganese, iron, nickel, and cobalt.

The silicate component may be an alkali metal silicate or other silicate which is soluble in alkali or part of the silicate component may be substituted in part by alkaline salts of the acids of the following elements:—sulphur, nitrogen, tin, arsenic and antimony. All of these compounds are capable of forming base exchange bodies with the other components, and are therefore to be considered the equivalents of the silicates.

The range of the new products used in the present invention is not limited to the elements present in the components which form the non-exchangeable nucleus of the zeolite. On the contrary, it is possible to substitute the alkali metal cations by other metal cations by means of base exchange. Thus for example, one or more of the following cations may be so introduced:—ammonium, copper, silver, gold, beryllium, magnesium, calcium, zinc, strontium, cadmium, barium, aluminum, titanium, zirconium, tin thorium, vanadium, chromium, uranium, manganese, iron, cobalt, nickel, palladium, and platinum. The elements or radicals may be introduced as simple or complex ions, or both, in any desired proportions. The introduction can be effected simultaneously or successively. The number of possible combinations by means of base exchange is of course very great, as will be readily apparent to a zeolite chemist. The number of new compounds is therefore greatly increased, and many valuable products, particularly catalysts or activators, can be produced by the introduction of suitable base exchange ions, which may increase the concentration of catalysts or activators in the product, or may result in a more finely tuned catalytic activity which is frequently possible by a suitable introduction of the desired cations by base exchange, frequently increases the permissible loading of the product in the contact sulphuric acid, and may increase the temperature resistance, the percentage yield which can be obtained thereby, or the output, or both.

A further series of catalysts can be obtained by treating the base exchange bodies of the present invention with compounds containing suitable acid radicals which form with the base exchange bodies salt-like bodies. While these products behave in many ways as if they were actual salts the exact chemical constitution of the products is not definitely known and the invention is not intended to be limited by any theory as to composition.

For the purposes of the present invention, acids or salts of the following elements may be used in order to produce salt-like bodies:—vanadium, tungsten, uranium, chromium, molybdenum, manganese, arsenic, sulphur and chlorine. Simple acids or their salts can be utilized, or polyacids, peracids and complex ions may be substituted wherever this is desirable. Other complex anions, such as ferro or ferricyanogen, sulphocyanogen, other metal cyanogens, ammonia complexes and the like are useful wherever they form salt-like bodies with the base exchange bodies with which they are to react. One or more acid radicals may be introduced in the above described manner, either simultaneously or successively, and the amount of acid radicals introduced can be quantitatively varied so that by this means salt-like base exchange bodies having the characteristics of acid, neutral or basic derivatives can be produced.

The diluted zeolites which I have found to be the most effective catalysts or contact masses for the contact sulphuric acid process can be prepared in a number of ways by the incorporation of a large variety of diluents, such as for example highly porous diluents, as kieselguhr, glaucosil, "Celite" brick refuse, silicates, inactive zeolites, pumice meal, and other products, or they may be coated onto natural or artificial massive carrier fragments. The method of incorporating, and nature of diluents which are to be used, has been described in detail in the co-pending application of Alphons O. Jaeger and Johann A. Bertsch, Serial No. 91,229, filed February 27, 1926, where the incorporation of diluents in two component zeolites is described. While the present products are chemically quite different from zeolites which are prepared from two components, the methods of precipitation are analogous. I have found, therefore, that in most cases the same methods of incorporating diluents which have been described in the prior application, above referred to, in connection with two component zeolites, may be advantageously used for the incorporation of diluents in base exchange bodies used in the present invention. As described in the prior application, the diluents may be incorporated into the physical structure of the base exchange bodies, or the base exchange bodies can be formed in the interstices of relatively coarser diluents. Specific methods of incorporating diluents with base exchange bodies of the present invention will also be described in many of the specific examples which are to follow, it being understood of course that the invention is in no sense limited to the details of the examples which are illustrative modifications only.

The precipitation of the base exchange bodies is frequently slow, and sometimes incomplete, and it is often desirable to accelerate or complete the precipitation by heating, vigorous stirring, or by the addition of acids, either organic or inorganic, in liquid or gaseous form. Thus for example, hydrochloric acid, sulphuric acid, carbonic acid, nitric acid, acetic acid, formic acid and the like, or their acid salts, may be used. Ammonium salts and salts of the alkalies as well as halogens, alcohols and other organic substances, are frequently advantageous in accelerating precipitation, and are included in the scope of the present invention. In some cases, it is advantageous to operate under pressure in autoclaves, and the present invention is therefore not limited in its broader aspects to operations under any particular pressure.

The important property of porosity of base exchange products of the present invention may in many cases be enhanced by the incorporation with the bodies, during formation, of products which are readily removable either by volatilization, combustion or by leaching, leaving behind additional pores, and thus still further contributing to the permeability of the framework of the base exchange products. The removable products to be used may be inorganic or organic, and include a wide number of products, but the choice of products will of course depend on the characteristics of the base exchange body.

The production of base exchange bodies usually results in a considerable percentage of soluble salts in the reaction mixture, and it is generally desirable to wash out these salts and to dry the products preferably at moderate temperatures which may advantageously be below 100° C. Some products may lack mechanical strength and may advantageously be washed or impregnated with a dilute waterglass solution, instead of with water, with a resulting surface silicification which considerably increases the mechanical strength of the product.

I find that it is advantageous to the subject the catalysts and contact masses used in the present invention to a preliminary treatment, consisting, first, in a calcination in the presence of air or other gases. This preliminary treatment and the catalytic process itself, which takes place at high temperature, results in certain chemical changes in the catalyst or contact mass which are not well defined, and when the catalyst is referred to in the claim, it should be considered as of the time when it is freshly made as is usual in catalytic chemical nomenclature.

The non-platinum contact masses particularly those using vanadium as the main catalytically active component, and which I have found to be the most effective, in addition to the great resistance to high temperatures and desirable mechanical strength, which is characteristic of all of the multi-component zeolite catalysts and contact masses used in the present invention, possess the further very important advantage, that they are substantially unaffected by substances which poison platinum catalysts. It is therefore possible, and this constitutes an important specific feature of the present invention, to carry out the contact sulphuric acid process without removing from the reaction gases substances which would act as poisons to platinum, it being only necessary in most cases to remove mechanically entrained dust. The expensive purification plants, which are essential where platinum catalysts are used, can therefore be eliminated, with a great saving in equipment and upkeep. Marked as are the advantages of the preferred non-platinum catalysts used in the present invention, it should be understood that in its broader aspects the invention is not limited to the use of such non-platinum catalysts or contact masses. On the contrary, contact masses containing platinum or metals of the platinum group, chemically combined with multi-component zeolites, may be used, and are excellent catalysts, as far as efficiency goes. They are of course subject in a greater or less degree to the disadvantages which are inherent in the use of platinum contact masses. Where, however, platinum contact masses are in use, or where the nature of the reaction gases is such that platinum catalysts can be used effectively, multi-component zeolite catalysts of the present invention containing platinum, find an important field of usefulness, and are therefore in no sense to be considered as excluded from the present invention, which, however, in its more specific embodiments includes as a special feature non-platinum catalysts with their resulting advantages.

The multi-component zeolites used in the present invention for the most part contain alkali forming metals in chemical combination which act as stabilizers. I have found that certain catalytically active elements or groups, which, however, are not selectively active for the contact sulphuric acid reaction, appear to enhance, or tune, the stabilizing effect of alkali forming metals present, and are here termed stabilizer promoters. Thus many heavy metal compounds, which may for example be present in diluents, or be introduced into the zeolite by base exchange, appear to have catalytic activity, but are not selective catalysts for the contact sulphuric acid process. Such elements, groups, or compounds will be referred to in the claims as stabilizer promoters.

The invention will be described more in detail in connection with the specific examples, which, however, do not limit the scope of the invention, although certain features described therein are of importance in certain specific aspects of the invention, and are included therein. It should be noted that wherever the strength of waterglass solutions is not specifically described in an example it should be understood that an ordinary commercial waterglass solution is meant to be used, having a strength of about 30° Bé., but which may in some cases vary from 25° to 35°. It is usually unimportant to have a waterglass solution of extremely accurately determined concentration, and solutions having concentrations which vary over fairly wide limits can be satisfactorily used.

Example 1.

16 parts of vanadic acid are formed into a slurry with 300 parts of water and are acidified with sulphuric acid. The mixture is then heated to boiling and a vigorous stream of sulphur dioxide is passed through the hot solution. In a short time, a blue solution of vanadyl sulphate is formed. After boiling out the excess sulphur dioxide, the blue solution can be divided into two portions in the ratio of 2 to 3. ⅗ths of the blue solution are cautiously treated with a concentrated caustic potash solution until a clear brown solution of potassium vanadite is formed. 140 parts of potassium water glass of 39° Bé. are diluted with 500 parts of water and the potassium vanadite is poured in with vigorous stirring. The mixture is then gently warmed and the remaining ⅖ths of the vanadyl sulphate is added in a thin stream with vigorous agitation, whereupon the mass first solidifies to a gray-green gel and on further stirring is transformed into readily filterable granular aggregates.

The amount of alkali used in the solutions should be so chosen that at the end of the reaction the mixture remains weakly alkaline or neutral to phenolphthalein. If the alkalinity of the reaction mixture is much greater, the precipitation is delayed but can be accelerated by the addition of about 50 parts of a saturated potassium sulphate solution which, by its salting out effect, improves the yield.

Another method of accelerating precipitation is to reduce the alkalinity of the reaction mixture by cautions addition of dilute acids or solutions of acid salts, such as, for example, hydrochloric acid, sulphuric acid, potassium bisulphate, and the like. By this means any desired degree of alkalinity or neutrality of the resulting reaction product can be easily obtained.

The reaction mixture is allowed to stand and is then decanted, pressed and washed with water. The presscake is dried preferably below 100° C. and the three component base exchange body containing $SiO_2$ and $V_2O_4$ is then broken into fragments or is hydrated with water in which case it also breaks into granules. The final product is a light gray, hard body having conchoidal fracture and possesses base exchange properties.

The base exchange body may be heated for a considerable period of time at 400 to 500° C. in a stream of diluted burner gases whereby it becomes a good contact mass for contact sulphuric acid.

If it is desired to dilute the base exchange body one or more of the three initial component solutions, preferably either the waterglass or the potassium vanadite solutions, are mixed with a total of from 60 to 80 parts of "Celite" brick refuse, the resulting product being a diluted base exchange body which can be dehydrated in a stream of hot air and carbon dioxide and after preliminary treatment with acid gases, such as, hydrochloric acid, nitric acid, sulphuric acid, is an excellent contact mass for the catalytic oxidation of $SO_2$ to $SO_3$. Burner gases containing 5–9% $SO_2$ are passed over the contact mass at temperatures of 400 to 550° C. whereby a high conversion of $SO_2$ to $SO_3$ is obtained.

The concentrated or diluted base exchange body may be treated by causing 3-5% solutions of heavy metal salts such as copper sulphate, nickel sulphate, aluminum sulphate, titanium sulphate, alone or in admixture, to trickle over it in order to effect base exchange whereby the resulting products are more resistant against high temperatures often obtainable in contact sulphuric acid process.

Example 2.

Three mixtures are prepared as follows:
1. 42 to 50 parts of $SiO_2$ in the form of about 33° Bé. potassium or sodium waterglass solution diluted with 20 volumes of water are mixed with kieselguhr or other materials rich in $SiO_2$, such as glaucosil, (the acid treated residue of green sand), until a suspension is obtained which is just stirrable.
2. 18 parts of $V_2O_5$ are dissolved in just sufficient 10–20% caustic potash or caustic soda solution so that potassium or sodium vanadate is obtained.
3. 18 parts of $V_2O_5$ are reduced with sulphur dioxide in aqueous suspension in the usual way to form the blue vanadyl sulphate about 200 to 300 parts of water being needed. The excess $SO_2$ is removed by boiling.

Mixtures 1 and 2 are poured together and solution #3 is permitted to flow in with vigorous agitation, care being taken that the reaction mixture remains at least alkaline to litmus. The alkalinity can be adjusted by slight additions of N. potassium hydroxide solution, if necessary. A dirty gray-blue gel results which is filtered with suction, washed with a little water and then dried and constitutes a three component base exchange body containing tetravalent and pentavalent vanadium in non exchangeable form and having materials rich in $SiO_2$ finely distributed throughout its framework.

After a short preliminary treatment at 400 to 500° C. with about 3% burner gases the product becomes an excellent contact mass for the contact sulphuric acid process. When 5–9% burner gases are passed over this contact mass a high conversion of $SO_2$ to $SO_3$ at temperature range of 400 to 550° C. results.

A still finer adjustment of the contact mass for the contact sulphuric acid process can be effected by exchanging part of the exchangeable alkali for other cations such as, for example, copper, silver, iron, cobalt, aluminum, titanium, calcium, manganese, cerium, strontium and nickel, using 3–6% solutions of these salts or their mixtures.

A further improvement in these contact masses for the contact sulphuric acid process can be effected by forming a salt-like body of the three component base exchange body with acids of the elements of the 5th and 6th groups of the periodic system, especially vanadium and tungsten, whereby the resistance of such contact masses against high temperatures is improved.

The diluents rich in silica, such as kieselguhr, which is stirred into the waterglass solution #1 may also advantageously be impregnated with 3–5% of the salts of the oxyacids of iron, nickel, silver, copper, cobalt, aluminum, or their oxides, and may be precipitated in the diluents with diluted alkali solutions in the usual way. Diluents may also be impregnated by metal vanadates, molybdates, tungstates, chromates, tantalates, especially of the heavy metals, 3–5% of such metallates being sufficient. This treatment of the diluents increases the catalytic effectiveness of the contact masses for the contact sulphuric acid process acting partly as catalytic components, and partly as stabilizer promoters.

Example 3.

Three mixtures are prepared as follows:
1. 210 parts of potassium waterglass solution of about 33° Bé. diluted with 6–8 volumes of water are mixed with a mixture of comminuted silicates and kieselguhr until the suspension just remains easily stirrable. The mixed diluent of silicates and kieselguhr preferably contains more than 25% of kieselguhr. The limits for the addition of the amount of diluents can be chosen within a large range without affecting the catalytic efficiency of the final product to any serious extent.
2. 18 parts of $V_2O_5$ in a hot aqueous suspension acidified by $H_2SO_4$ are reduced to a blue vanadyl sulphate solution by means of sulphur dioxide and the vanadyl sulphate obtained is transformed into a brown solution of potassium vanadite by treatment with sufficient 10 N. caustic potash solution in the usual way.
3. A 10% aluminum sulphate solution is prepared.

Suspension 1 and solution 2 are poured together and under vigorous agitation a sufficient amount of the aluminum sulphate solution is added in a thin stream to bring the reaction mixture to neutrality to phenolphthalein or to a point which is just on the alkaline side. The mass solidifies to a dirty green gel which is filtered with suction, slightly washed and dried, constituting a diluted base exchange body which contains tetravalent vanadium, aluminum and $SiO_2$ in non-exchangeable form. The diluents can also be suspended in the solution 2 or in the mixture of the suspension 1 and solution 2 with the same result.

Solution 2 can be substituted in part or in whole by a potassium vanadate solution made by dissolving the $V_2O_5$, without reduction, directly in 2 N. potassium vanadate solution made by dissolving the $V_2O_5$, without reduction, directly in 2 N. potassium hydroxide. In this case a gel is produced which contains $V_2O_4$ and $V_2O_5$, or only $V_2O_5$, $Al_2O_3$ and $SiO_2$ corresponding to the three classes of components used in the initial solutions.

The solution 3 can also be substituted in part or in whole by other metal salt solutions, for example, copper sulphate, nickel sulphate, cobalt sulphate, iron sulphate, manganese nitrate, ferric chloride and the like, alone and in admixture.

The bodies, drying preferably at 100° C., may be changed by base exchange or by the formation of salt-like bodies, the broken base exchange body being first hydrated by trickling water over it.

In the formation of good, practical contact masses for the contact sulphuric acid process by base exchange or salt-like body formation the elements described in Example 2 may be used with effect.

After a short preliminary treatment at about 400° C. with diluted burner gases the products obtained are well suited for the contact sulphuric acid process. 6–9% burner gases passed over such contact masses will show high conversions of $SO_2$ to $SO_3$ at a temperature range of 400 to 550° C.

Example 4.

A diluted three component base exchange body, or its salt-like body, as described in the foregoing examples, is coated onto massive carrier fragments of natural or artificial origin, such as, for example, materials rich in silica, as quartz fragments, quartz filter stones, sand stones, fragments of silica gel, diatomaceous stones, "Celite" bricks, pumice fragments, fragments of natural or artificial silicates with or without base exchanging properties especially zeolites diluted with materials rich in silica, unglazed porcelain fragments, metals, such as aluminum granules, metal alloys, such as ferro-silicon, ferro-vanadium, ferro-chrome, and the like, particularly when their surface has been roughened. The coating of these carrier materials can take place either after formation of the product, or the product can be caused to react on the carrier fragments and can be generated in situ in such a way that the alkaline reacting components, e. g., the waterglass and metallate solutions, are first coated on the carrier fragments and then the metal salt component is sprayed on them, whereby the three component zeolite, in the form of a good adhesive film, is fixed on the carrier fragments. The coating process may also be carried out in the reverse order.

Artificial fragments can also be prepared, for example, by forming fragments of "Celite" kieselguhr, pulverized quartz, silica gel, pulverized silicates and diluted or undiluted zeolites, using various adhesives such as waterglass, alkalies or alkali metal salts followed by calcination, preferably at 400 to 500° C., and if desired, a treatment with inorganic acids, such as, sulphuric acid, nitric acid, hydrochloric acid and the like.

Other initial materials for the preparation of artificial carrier fragments can also be used, such as, greensand, pretreated with alkali and waterglass in different ways and then water-hydrated in order to improve the physical properties of the material especially its absorptive power which is so very advantageous in the catalytic oxidation of $SO_2$ to $SO_3$. A further voluminous carrier mass is produced by treating finely ground silica such as diatomaceous earth, etc., with lime in the presence of water with or without heating. Instead of lime other oxides or hydroxides, such as, strontium may be used. The product is then dried and pulverized or the wet mass may be calcined and carbonated during or after calcination. By this process a considerable amount of hydrated calcium metasilicate is produced which is a very useful diluent for the preparation of catalytically active diluted zeolites for the contact sulphuric acid process, and also for the preparation of artificial carrier fragments used in this process.

In coating such carrier fragments undiluted three component base exchange body, as described in the foregoing examples, can also be applied, especially when generated in situ. For the preparation of such an undiluted base exchange body it is only necessary to omit the diluent bodies, as described in these examples, and in order to get a good coating on the carrier fragments, if necessary, various adhesives can be used, such as, for example, alkaline, neutral and acid salts or the alkali-forming metals, such as, sulphates, chlorides, nitrates, waterglass, carbonates, hydroxides, and the like.

The ratio of coating is about 1 kilo. by weight of diluted or undiluted base exchange bodies to 10 liters of pea-size carrier fragments.

Instead of introducing diluent bodies in the three component base exchange bodies during formation, as described in the foregoing examples, the undiluted base exchange bodies can be prepared from their components, and after preparation mixed mechanically in aqueous suspensions with diluent bodies, or the base exchange bodies may be dried and then pulverized and then mixed with the latter.

For example, if the exact amounts as in the foregoing examples are used for the preparation of the undiluted three component base exchange bodies with catalytic effectiveness for the contact sulphuric acid process, 50 to 100 parts of diluent bodies may be used and the mixture formed into granules with any of the above described adhesives, especially waterglass.

The products thus produced, as described in these examples, are efficient contact masses for the catalytic oxidation of $SO_2$ to $SO_3$, when 6 to 8% burner gases are passed over these contact masses at the usual gas velocity and at a temperature of 400 to 550° C., whereby the operating conditions in the converter are so adjusted that the most favorable temperatures, first, for high reaction velocity (500 to 550° C.) and then, for the most favorable equilibrium in the reaction (400° C.), are obtained.

*Example 5.*

6 parts of $V_2O_5$ are suspended in 150 parts of water to form a slurry acidified with 2 to 3 parts of concentrated sulphuric acid and then reduced to the blue vanadyl sulphate, for example, by means of gases containing $SO_2$ which are passed into the solution at boiling temperature. 54 parts of waterglass solution of 33° Bé. are diluted with 200 parts of water and about 60 to 80 parts of "Celite" brick refuse stirred in. The waterglass solution is then poured into the vanadyl sulphate solution with vigorous agitation precipitating out vanadyl silicate. Care should be taken that after all the solutions have reacted the resulting mixture must be made neutral to litmus, if necessary, with the help of small amounts of N. sulphuric acid.

150 parts of potassium waterglass of 33° Bé. are diluted with 300 parts of water.

6 parts of $V_2O_5$ are transformed with the help of N. KOH to potassium vanadate and the aluminate solution and vanadate solutions are mixed together.

40 parts of $Al_2(SO_4)_3$ 18 aq. are dissolved in 250 parts of water. To this solution ground diluted vanadyl silicate is added with vigorous agitation in order to bring about a good suspension, then the mixture of the two solutions of aluminate and vanadate are added in a thin stream with strong agitation. The reaction mixture, after the addition of the mixed solutions, must be neutral or alkaline to phenolphthalein. If the reaction mixture is strongly alkaline to phenolphthalein the alkalinity can be decreased by using corresponding amounts of N. sulphuric acid. The reaction mixture is separated from the mother liquor in the usual way and washed with twice the amount of the mother liquor obtained, dried and broken in suitable pieces.

After calcining in order to dehydrate the contact mass diluted $SO_2$ gases are first passed over the contact mass for a short time followed by 7 to 9% burner gases, whereupon a very efficient contact sulphuric acid process sets in at temperatures between 420 and 500° C. The ratio of the burner gases to the contact mass is best when 1500 volume parts of 7 to 9% burner gases per hour are used for 200 volume parts of contact mass.

In this example the potassium aluminate solution which represents the metallate component and the $SiO_2$ component, both of which are alkaline, are added to the metal salt component, instead of vice versa, as described in the other examples, and by this converse method well defined contact masses can also be made which possess, before use, base exchanging properties and are efficient contact masses for the contact sulphuric acid process.

Instead of the potassium vanadate solution as the metallate component, other catalytically active metallates such as tungstates and molybdates may be used.

Instead of aluminum sulphate as the metal salt component, other metal salts suitable for the contact sulphuric acid process, such as iron, copper, silver, nickel, cadmium, titanium, zirconium, and chromium salts, can be used singly or in admixture.

*Example 6.*

A mixture of 10 partes of $V_2O_5$ and 4 parts of $WO_3$ are dissolved in 300 parts of diluted KOH solution containing 10.5 parts of 90% KOH. Add to this solution under vigorous agitation about 90 parts of "Celite" brick refuse or a mixture of comminuted quartz and diatomaceous earth equal in volume to the "Celite" brick refuse. Other diluents, such as described in Example 4 are also applicable.

The suspension is heated up to 80 or 90° C. and is gradually made faintly acid to congo, using 2 N. sulphuric acid in order to precipitate out $V_2O_5$, and $WO_3$, in this diluent or in the mixture of the diluents. The mixture obtained is then dried and ground.

40 parts of 33° Bé. potassium waterglass solution are weighed out. 2 parts of $Al_2O_3$ are transformed in the usual way, with the help of 5 N. potassium hydroxide solution, to the corresponding potassium aluminate. The two solutions are then mixed together and immediately after mixing, kneaded thoroughly with the $V_2O_5$ and $WO_3$ precipitated in "Celite" brick refuse and then formed in suitable pieces. These formed pieces are then dried at temperatures under 100° C. preferably with gases containing $CO_2$ whereby a diluted three component base exchange body is obtained, containing $V_2O_5$, $WO_3$, $Al_2O_3$ and $SiO_2$ in the non-exchangeable part.

The contact mass so obtained is calcined with $SO_2$ gases strongly diluted by air and when thereupon treated with 7 to 9% gases a very efficient contact sulphuric acid process sets in.

Instead of $V_2O_5$ and $WO_3$ other catalytically effective components can be used in the same way for the preparation of the contact mass, such as $V_2O_4$ and $MoO_3$.

Instead of using potassium aluminate other metallates of amphoteric elements can be used, such as Cd, Be, and Zn. In order to increase the resistance of such contact masses to high temperatures often obtainable in the contact sulphuric acid process, so-called stabilizer promoters, such as 5% $Fe_2O_3$ and $TiO_2$ can be embedded in the contact mass during its formation.

*Example 7.*

1. 6.6 parts of freshly precipitated $Al_2O_3$, are dissolved in N. KOH solution in order to form the corresponding potassium aluminate. To this solution are added diluents rich in $SiO_2$ such as comminuted silicates, quartz, ground rocks, tuffs, lava of volcanic or eruptive origin, artificial and natural zeolite, kieselguhr, "Celite" brick refuse. In using "Celite" brick refuse or kieselguhr 80 to 100 parts are the proper amount in order to prepare the diluted three component zeolite.

Very suitable diluents may also be specially prepared, for example, colloidal $SiO_2$ or $SiO_2$ obtained from natural or artificial base exchanging silicates which are treated with diluted mineral acids in order to remove the alkali in the exchangeable part of the base exchange bodies and the amphoteric metal oxide whereby a $SiO_2$ complex is obtained with high absorptive properties. $SiO_2$ so prepared, mixed with "Celite" brick refuse or kieselguhr is an excellent diluent for the preparation of zeolite contact masses in the contact sulphuric acid process.

In some cases it is also advantageous to add 5 to 10% of specially prepared silicates which act in this process as stabilizer promoters. Such silicates are an intermediate step in the preparation of the complex $SiO_2$ from artificial and natural base exchanging silicates. Such base exchanging silicates as leucite or artificial zeolites as commonly prepared are leached out with diluted mineral acids such as 5 to 10% sulphuric acid, hydrochloric acid or nitric acid, in order to remove the alkali from the exchangeable part of the base exchange body, whereby the amphoteric metal oxide in chemical combination with the $SiO_2$ group should remain. Such silicates have a very high absorptive power and are excellent means to tune the stabilizer action of the stabilizers in complex combination with the catalytically active portions of the contact masses.

2. 80 parts of a potassium waterglass solution of an approximate strength of 33° Bé. are dissolved with 100 parts of water.

3. 24 parts of $Al_2(SO_4)_3$ plus 18 aq. are dissolved in 150 parts of water.

The aluminate suspension 1 is quickly mixed with the waterglass solution under strong agitation and the aluminum sulphate solution is added in a thin stream whereby a diluted gelatinous three component base exchange body is obtained containing $Al_2O_3$ and $SiO_2$ in the non-exchangeable part. The mother liquor of the base exchange body is removed in the usual way, the presscake obtained is dried preferably below 100° C., and then broken in suitable pieces. In order to increase the yield small amounts of very diluted $H_2SO_4$ (5%) may be used whereby care must be taken that the reaction product and the mother liquor remain substantially neutral or weakly alkaline to phenolphthalein.

In this base exchange body the silicate and metallate components predominate over the metal salt components so that the resulting product resembles an alumino-silicate type of zeolite.

Using the same amount of components another type of three components zeolite can be obtained when the order, in which the three classes of components are reacting together, is changed. In this case the alkaline reacting components, the aluminate and waterglass solutions, are poured into the aluminum sulphate solution whereby the diluents may be present in the mixture of the alkaline components or in the metal salt component. The gelatinous mass obtained is worked up in the same way as before and dried. The metal salt component and metallate component may also first act together in which case the diluent body should be in one of these two components, and then the $SiO_2$ component is added.

These methods show the many possible modifications for the preparation of certain types of three component base exchange bodies.

Instead of changing the order in which the three classes of components react together, the amount of the components may be changed whereby other types of three component zeolites are obtained.

This is the case in using the following percentage amounts of the components:

1. 3.4 parts of $Al_2O_3$, freshly precipitated, are dissolved in N. KOH solution in order to form the potassium aluminate solution as the metallate component.

2. 120 to 150 parts of potassium waterglass of 33° Bé. are dissolved in about 200 parts of water.

3. 44.5 parts of $Al_2(SO_4)_3$ plus 18 aq. are dissolved in about 200 parts of water.

The diluent is added to one or the other or to the mixture of the alkaline reacting components.

A special method for the preparation of this three component zeolite consists of mixing the aluminate and SiO₂ component together and then adding aluminum sulphate component or vice versa. The reaction product as obtained its worked up in the usual way and in this case the metal salt and silicate components predominate over the metallate component whereby the resulting three component zeolite resembles in certain ways an aluminum double silicate type of zeolite.

The preparation of three component base exchange bodies in which the metallate and metal salt components predominate over the silicate component whereby the product obtained resembles a non-silicious base exchange body, is carried out as follows:

1. 5 parts of $Al_2O_3$, freshly precipitated, are dissolved in N. KOH solution in order to form the corresponding potassium aluminate.
2. 34 parts of $Al_2(SO_4)_3$ plus 18 aq. are dissolved in 200 parts of water.
3. 50 parts of potassium waterglass solution of 33° Bé. are dissolved in 100 to 150 parts of water.

To one of the components or to the mixture of the alkaline reacting components the above described diluents may be added in the proper amount.

A base exchanging body of this type with well developed base exchanging power is obtained when the aluminate and silicate components are mixed together and then the aluminum sulphate component is added with strong agitation. The reaction product obtained is freed from the mother liquor and dried in the usual way. Another modification can be obtained when the components react in the converse order.

Instead of using $Al_2O_3$ for the metallate component other components of this class may be used which contain vanadium, tungsten, molybdenum, lead, zinc, cadmium, with or without aluminum singly or in admixture.

Instead of using aluminum sulphate other metal salts, with or without aluminum sulphate, may be used singly or in admixture such as, for example, those which contain vanadium especially vanadyl sulphate, zinc, cadium, titanium, zirconium, copper, nickel, cobalt, silver, beryllium, cerium, tin, thorium, manganese, chromium.

Depending on the components selected base exchange bodies can be obtained which are directly catalytically active in the contact sulphuric acid process, especially when vanadium is used as one of such components.

When components are used which, in the combination of the base exchange body, are not catalytically active, the catalytically active component may be introduced by base exchange or by the formation of salt-like bodies, or by both, in which case the catalytic power resides, especially in the case of the formation of salt-like bodies in chemical combination with the three component zeolite.

The diluted three component zeolite which contains aluminum and $SiO_2$ in the non-exchangeable part has no catalytic power for the contact sulphuric acid process and this body can be transformed into an efficient contact mass in several ways. The alkali metal in the exchangeable part of the base exchange body may be replaced partly or mainly by other metals, especially the heavy metals, such as, iron, copper, nickel, cobalt, manganese, silver, also titanium, zirconium, aluminum, by trickling over 5 to 10% solutions of the corresponding salts or their mixtures at regular temperatures or somewhat elevated temperatures in order to accelerate the base exchange. In order to perform this before applying the salt solution it is advantageous in many cases to hydrate the base exchange body by trickling water over it. After this treatment the base exchange bodies are brought into reaction with ammonium vanadate or other soluble vanadates in order to form the vanadate of the base exchange body. In order to accomplish this procedure the best method is to impregnate the base exchange body with the vanadate solution and after reaction to wash out the alkali. The base exchange body changes color to the corresponding vanadates. For this purpose a 1 to 10% solution of vanadate may be used.

After drying the contact mass so obtained may first be calcined at 400 to 500° C. with air and then with diluted burner gases containing about 3% $SO_2$. After this treatment 7 to 8% burner gases are passed over the contact mass whereupon an efficient contact sulphuric acid process sets in at temperatures of from 420 to 550° C. The temperature distribution thruout the catalyst extent should be such that a high temperature of 500 to 550° C. obtains in the portion of the contact mass which comes into contact with the concentrated $SO_2$ gases and where maximum reaction velocity is desired, while the last portions of the contact mass are kept at temperatures from 400 to 420° C. which favor the best reaction equilibrium.

In many cases it is desirable to introduce catalytically active component in the exchangeable portion of the three component zeolite molecule. An especially effective product is obtained by treating the zeolite with a 3 to 5% vanadyl sulphate solution to remove a maximum of the exchangeable alkali metal. The product thus obtained may also be treated with 3 to 5% solutions of vanadates, tungstates, molybdates or their mixtures to form salt-like bodies and thus still further increase the concentration of the catalytic components in chemical combination with the 3 component zeolite. These contact masses are also excellent for the contact sulphuric acid process.

Effective contact masses, for the contact sulphuric acid process can also be produced by introducing catalytically active diluents into zeolites of these types. These diluents may advantageously contain 5 to 10% of metallates of the 5 and 6th groups of the periodic system, such as silver vanadate, copper vanadate, manganese vanadate and the like, singly or in admixture. The diluents are preferably incorporated with the zeolites to form a physically homogeneous structure.

A further improvement in the contact masses can be obtained when so-called stabilizer promoters are added to the diluents described above, which stabilizer promoters tune the stabilizer action of the alkali in the base exchange part of the three component zeolite. In many cases 2 to 5% of such stabilizer promoters are sufficient. $Fe_2O_3$, $TiO_2$ or silicates especially of the heavy metals possess excellent stabilizer promoter properties for the contact sulphuric acid process.

The modifications described in this example show the large number of highly efficient catalysts for the contact sulphuric acid process which can be prepared according to the present invention.

Example 8.

1. 20 parts of $V_2O_5$ are dissolved in 150 to 200 parts of water containing about 17 parts of 90% KOH.

2. 6 parts of $CuSO_5$, 5 aq. are dissolved in 150 to 200 parts of water and a concentrated ammonia solution is added until a clear blue solution of cuprammonium complex is obtained.

3. 2 parts of freshly precipitated $Al_2O_3$ are dissolved in the corresponding amount of 2 N. KOH solution in order to form potassium aluminate.

4. 80 parts of potassium waterglass of 33° Bé. are diluted with two volumes of water and 10% ammonia is added until the cloudy precipitate obtained at first is again dissolved.

5. 42 parts of $Fe_2(SO_4)_3$, 9 aq. are dissolved in 200 parts of water.

The aluminate and cuprammonium complex solutions are poured together and 80 to 90 parts of unground infusorial earth are added in order to form a suspension of this diluent with the mixture.

The mixture of the vanadate and waterglass solution are then added with vigorous agitation and the ferricsulphate solution is poured in in a thin stream. The reaction mixture remains alkaline to phenolphthalein and the desired slightly alkaline or neutral reaction to phenolphthalein can be easily adjusted by adding diluted $H_2SO_4$. The product so obtained is freed from the mother liquor by filtering and pressing and is washed with about 300 parts of water in portions. The filtercake is then dried at temperatures preferably below 100° C. and broken into small fragments. The three component zeolite obtained contains in non-exchangeable form vanadium, copper, aluminum, iron, and $SiO_2$ diluted with unground infusorial earth. Before use, this contact mass is calcined with air at 400° C. in order to dehydrate the mass.

After a thorough preliminary treatment at about 450° C. with diluted burner gases the mass obtained is well suited for the contact sulphuric acid process. 6 to 9% burner gases passed over the contact mass will show high conversion of $SO_2$ to $SO_3$ at a temperature range of 400 to 550° C., by the operating conditions in the converter being so adjusted that the most favorable temperatures for high conversion, first for high reaction velocity (500 to 550° C.) and then for the most favorable equilibrium in the reaction (400° C.) are obtained.

Example 9.

Quartz fragments about the size of a pea are treated with about a 20% solution of hydrofluoric acid in order to etch the surface of the quartz fragments. On these carrier fragments a three component base exchange body containing platinum is formed the amount of the coating being about 10% of volume of the carrier fragments. Instead of forming the base exchange body in situ on the fragments the finished three component base exchange body may be pulverized and afterwards coated on the carrier fragments with the aid of adhesive substances such as waterglass, $MgSO_4$, KOH, NaOH and the like.

The base exchange body is prepared in the following way:

1. 2 parts of $Al_2O_3$ are transformed into potassium aluminate using a N. potassium hydroxide solution.

2. 40 parts of sodium waterglass solution are diluted with five times the amount of water.

3. 4 parts of $H_2PtCl_6$ are prepared in a 2 to 5% solution.

4. 15 parts of $Fe_2(SO_4)_3$, 9 aq. are dissolved in water.

The solutions 1 and 2 are poured together and the mixture of the solutions 3 and 4 is poured in with vigorous agitation care being taken that the resulting three component base exchange body containing aluminum $SiO_2$, iron and platinum in non-exchangeable form remains alkaline to litmus or preferably neutral to phenolphthalein.

The base exchange body obtained is freed from the mother liquor by pressing and then dried. Before using this material it may advantageously be hydrated by trickling water over it until the water which drains off does not contain appreciable amounts of salts.

Instead of an undiluted base exchange body a diluted base exchange body, especially one containing powdered quartz, silicates or other materials rich in silica, such as, colloidal $SiO_2$, kieselguhr and the like, is an effective catalyst for the contact sulphuric acid process and can also be coated on to carrier fragments, as described above, a large saving of platinum being thereby obtained.

After preliminary treatment with about 3% burner gases a platinum contact mass is obtained which is highly efficient for the contact sulphuric acid process.

*Example 10.*

Highly effective base exchange bodies for the contact sulphuric acid process may be obtained by the combination of diluted or undiluted three component zeolites with other diluted and undiluted base exchange bodies which may or may not contain $SiO_2$ in the non-exchangeable part.

Many different methods of preparation of such contact mass combinations may be used. Thus the three component zeolite may be embedded in other base exchange bodies alone or in admixture with part of them, or vice versa; but in the preparation of such contact mass combinations care must be taken that at least one of the catalytically active elements or radicals is chemically combined with or in the three component zeolite. The following description of such contact masses demonstrates many possible contact mass combinations of high efficiency for the contact sulphuric acid process.

16 parts of vanadic acid are formed into a slurry with 300 parts of water and then acidified with sulphuric acid. The mixture is then heated to boiling and a vigorous stream of sulphur dioxide is passed through the hot solution. In a short time a blue solution of vanadyl sulphate is obtained. After boiling out the excess sulphur dioxide the blue solution can be divided into two portions in the proportion of 2:3.

1. ⅗ of the blue solution are cautiously treated with a concentrated caustic potash solution until a clear brown potassium vanadite solution is obtained.

2. 140 parts of potassium waterglass solution of about 36° Bé. are diluted with 500 parts of water.

3. The remaining ⅖ of the vanadyl sulphate solution constitutes the metal salt component for the preparation of the zeolite. The waterglass and potassium vanadite solutions are poured together and then the vanadyl sulphate solution is added in a thin stream with vigorous agitation whereupon the mass first solidifies to a gray-green gel and on further stirring is transformed into readily filterable granular aggregates. In the preparation naturally care must be taken that at least the resulting mixture remains weakly alkaline or neutral to phenolphthalein which can be adjusted by adding so much diluted (about 5%) $H_2SO_4$ until the proper alkalinity or neutrality is obtained whereby the yield of the three component base exchange body can be increased. The yield can also be bettered by the addition of saturated alkali metal salts such as potassium sulphate or potassium bi-sulphate whereby the latter also takes care of the excess of alkali in the preparation of such bodies.

The reaction mixture is allowed to stand, decanted, pressed and washed with water. The presscake is dried and the three component base exchange body containing $SiO_2$ and $V_2O_4$ is then ground, or preferably before grinding, the base exchange body may first be hydrated by trickling water over it and dried again. Instead of this base exchange body the corresponding diluted base exchange body may be prepared preferably using as diluents materials rich in $SiO_2$ such as kieselguhr.

Either base exchange body may be embedded in a two component zeolite or in a base exchange body which does not contain $SiO_2$ as one of the original initial components.

90 parts of 33° Bé. potassium waterglass solution are diluted with 4 to 5 volumes of water and the three component zeolite obtained above and such an amount of unground infusorial earth is added with vigorous stirring for uniform distribution of the diluents that the mixture remains stirrable. When the diluted three component base exchange body is used in the preparation of this contact mass it is not necessary to add the infusorial earth as a further diluent to the waterglass solution.

60 parts of aluminum sulphate containing 18 mols. of water are dissolved in 200 parts of water and sufficient 20% ammonia water is added in order to precipitate aluminum hydroxide. The aluminum hydroxide is then freed from the mother liquor, washed and treated with sufficient 2 N. potassium hydroxide solution to produce the corresponding aluminate solution. The aluminate solution is then stirred into the suspension of waterglass and the three component zeolite and the mixture is heated up to about 60° C. A gelatinous precipitate is obtained and is increased by the gradual addition of 2 N. sulphuric acid. In adding the sulphuric acid, care should be taken, however, that the reaction is maintained at least weakly alkaline to phenolphthalein. The stirring is continued for about an hour, the mixture being gradually permitted to cool down to room temperature. The gelatinous precipitate obtained is pressed and washed with 200 parts of water in small portions and the filter cake obtained is then dried and broken into fragments of suitable size.

2 to 4 volumes of this contact mass thus produced are placed in a contact sulphuric acid converter and 1,000 to 2,000 volumes of 7 to 9% burner gases are passed over the contact mass per hour at temperatures of about 420 to 550° C. and a high percentage conversion of $SO_2$ to $SO_3$ is obtained.

In the preparation of this contact mass the two component zeolite also may contain catalytically active components. Instead of using this 2 component zeolite a three component zeolite with or without specific catalytic efficiency for the contact sulphuric acid process may be used, especially as described in Example 7.

The process for the preparation of such contact masses may also be carried out in the reverse order.

The three component base exchange body may also be embedded in a base exchange body which is prepared in the following way:

12.2 parts of freshly precipitated aluminum oxide are brought into solution with 40 parts of 100% KOH in 200 parts of water. The three component base exchange body described above is then stirred into the solution and a 10% aqueous solution containing 37 parts of ferric sulphate with 18 mols. of water or 44.4 parts of aluminum sulphate with 18 mols. of water, or a mixture of the two, is added to the aluminate solution with vigorous agitation. A corresponding amount of titanium sulphate, zirconium sulphate and thorium nitrate may also be used.

The reaction product obtained which is an aluminum base exchange body and which does not possess any catalytic properties for the contact sulphuric acid process is diluted with the catalytically active three component base exchange body and the combination of the two constitutes a highly active contact mass for the contact sulphuric acid process.

In the preparation of this base exchange body in which the diluted three component zeolite is embedded a component may also be used which possesses catalytically active properties. The process may also be carried out in the reverse order that is to say, the non-siliceous base exchange body may be embedded in the three component zeolite.

All contact masses obtained may be treated with 5% solutions of the salts of the heavy metals as copper sulphate, iron sulphate, etc., in order to replace partly or to the largest possible extent the alkali metal of the base exchanging part of this zeolite combination. In some cases, it may also be advantageous to produce so-called salt-like bodies as described in preceding examples. The introduction of heavy metals in the base exchanging part of such zeolite combinations and the formation of so-called salt-like bodies results very often in contact masses highly resistant against high temperatures frequently obtained in the contact sulphuric acid process.

In the claims the expression "multi-component zeolite" will be strictly limited to zeolites which are the reaction products of at least one silicate, part of which may be replaced by a compound of an equivalent acidic oxide, at least one metallate as defined above, and at least one salt, the basic radical of which contains a metal which is capable of forming part of the non-exchangeable nucleus of a zeolite. It should be noted that this definition specifically excludes reaction products of silicates and metallates where alkali-forming metal salts or the salts of other metals incapable of forming part of the non-exchangeable nucleus of a zeolite are present.

What is claimed as new is:

1. A process of catalytically oxidizing sulphur dioxide to sulphur trioxide, which comprises passing a gaseous mixture containing sulphur dioxide and oxygen, at an elevated temperature, over a catalyst which contains at least one multi-component zeolite having chemically combined therewith a catalytically active component.

2. A process of catalytically oxidizing sulphur dioxide to sulphur trioxide, which comprises passing a gaseous mixture containing sulphur dioxide and oxygen, at an elevated temperature, over a catalyst which contains at least one catalytically active multi-component zeolite, at least one catalytically active component chemicaly combined in non-exchangeable form.

3. A process of catalytically oxidizing sulphur dioxide to sulphur trioxide, which comprises passing a gaseous mixture containing sulphur dioxide and oxygen, at an elevated temperature, over a catalyst which contains at least one catalytically active multi-component zeolite body, which contains no elements of the platinum group.

4. A process according to claim 3, in which the reaction gases are freed from mechanically entrained dust before passing over the catalyst, but which contain poisons for platinum catalysts.

5. A process of catalytically oxidizing sulphur dioxide to sulphur trioxide, which comprises passing a gaseous mixture containing sulphur dioxide and oxygen, at an elevated temperature, over a catalyst which contains at least one catalytically active multi-component zeolite, containing vanadium in chemical combination.

6. A process of catalytically oxidizing sulphur dioxide to sulphur trioxide, which comprises passing a gaseous mixture containing sulphur dioxide and oxygen, at an elevated temperature, over a catalyst which contains at least one catalytically active, multi-component zeolite containing vanadium in non-exchangeable form.

7. A process of catalytically oxidizing sulphur dioxide to sulphur trioxide, which comprises passing a gaseous mixture containing sulphur dioxide and oxygen, at an elevated temperature, over a catalyst which contains at least one catalytically active multi-component zeolite body admixed with diluent bodies to form a physically homogeneous structure.

8. A process of catalytically oxidizing sulphur dioxide to sulphur trioxide, which comprises passing a gaseous mixture containing sulphur dioxide and oxygen, at an elevated temperature, over a catalyst which contains at least one catalytically active multi-component zeolite body coated onto massive carrier fragments.

9. A process according to claim 7, in which the diluents contain stabilizer promoters.

10. A process according to claim 7, in which the diluents contain catalytically ineffective base exchange bodies.

11. A process according to claim 7, in which the diluents contain catalytically effective components.

12. A process of catalytically oxidizing sulphur dioxide to sulphur trioxide, which comprises passing a gaseous mixture containing sulphur dioxide and oxygen, at an elevated temperature, over a catalyst which contains at least one multi-component zeolite which has been caused to react with a catalytically effective acid radical and form therewith a salt-like body.

13. A process of catalytically oxidizing sulphur dioxide to sulphur trioxide, which comprises passing a gaseous mixture containing sulphur dioxide and oxygen, at an elevated temperature, over a catalyst which contains at least one multi-component zeolite body which has been caused to react with a vanadium-containing acid radical to form a salt-like body.

14. A process according to claim 12, in which the zeolite is catalytically inactive.

15. A process according to claim 13, in which the zeolite is catalytically inactive.

Signed at Pittsburgh, Pa. this 30th day of July, 1927.

ALPHONS O. JAEGER.